United States Patent
Oh et al.

(10) Patent No.: US 12,403,951 B2
(45) Date of Patent: Sep. 2, 2025

(54) REAR WHEEL STEERING CONTROL SYSTEM AND METHOD FOR VEHICLES

(71) Applicants: Hyundai Motor Company, Seoul (KR); Kia Corporation, Seoul (KR)

(72) Inventors: Jun Wook Oh, Hwaseong-si (KR); Rae Wook Chung, Yongin-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 544 days.

(21) Appl. No.: 17/716,378

(22) Filed: Apr. 8, 2022

(65) Prior Publication Data

US 2022/0410965 A1 Dec. 29, 2022

(30) Foreign Application Priority Data

Jun. 28, 2021 (KR) .......... 10-2021-0084074

(51) Int. Cl.
 *B62D 6/00* (2006.01)
 *B62D 5/04* (2006.01)

(52) U.S. Cl.
 CPC .......... *B62D 6/002* (2013.01); *B62D 5/0463* (2013.01)

(58) Field of Classification Search
 CPC .......... B62D 6/00; B62D 7/159; B62D 6/002; B62D 15/021; B62D 5/0463; B62D 6/001; B62D 6/003; B60Y 2400/301
 USPC ....................................................... 180/445
 See application file for complete search history.

(56) References Cited

U.S. PATENT DOCUMENTS

| 2008/0243339 | A1* | 10/2008 | Nishimori | B60G 7/003 |
| | | | | 701/41 |
| 2018/0297634 | A1* | 10/2018 | Kim | B62D 7/159 |
| 2019/0315396 | A1* | 10/2019 | Yamamoto | B62D 15/0265 |
| 2020/0130735 | A1* | 4/2020 | Chung | B62D 7/159 |
| 2021/0362782 | A1* | 11/2021 | Sakayori | B62D 7/159 |
| 2022/0073133 | A1* | 3/2022 | Sakayori | B62D 7/1509 |

FOREIGN PATENT DOCUMENTS

| JP | H0443166 A | * | 2/1992 |
| KR | 10-2018-0111869 | | 10/2018 |
| KR | 10-2019-0062186 | | 6/2019 |

OTHER PUBLICATIONS

JPH04043166—English Translation (Year: 1992).*

* cited by examiner

*Primary Examiner* — Scott A Reinbold
(74) *Attorney, Agent, or Firm* — Morgan Lewis & Bockius LLP

(57) ABSTRACT

A rear wheel steering control system and method for vehicles may gradually perform rear wheel steering at a gentle ramp-up slope, compared to a conventional rear wheel steering control system and method, for a predetermined time period when the ignition of a vehicle is turned on in the state in which a front wheel steering angle is generated, to prevent rear wheels from being rapidly steered and to eliminate a sense of difference felt by a driver due to rapid rear wheel steering.

15 Claims, 5 Drawing Sheets

FIG. 1

LOW SPEED: COUNTER-PHASE

FIG. 2

HIGH SPEED: IN-PHASE

REAR WHEEL STEERING CONTROL SYSTEM AND METHOD FOR VEHICLES

CROSS-REFERENCE TO RELATED APPLICATION

The present application claims priority to Korean Patent Application No. 10-2021-0084074 filed on Jun. 28, 2021, the entire contents of which is incorporated herein for all purposes by this reference.

BACKGROUND OF THE INVENTION

Field of the Invention

The present invention relates to a rear wheel steering control system and method for vehicles. More particularly, it relates to a rear wheel steering control system and method for vehicles which may prevent rear wheels from being rapidly steered when the ignition of a vehicle is turned on in the state in which a front wheel steering angle is generated.

Description of Related Art

A vehicle may desirably reduce a turning radius thereof during low-speed driving to change its direction rapidly, whereas, during high-speed driving, a stable steering and turning may be prioritized.

For the present purpose, a rear wheel steering (RWS) system configured to control a rear wheel steering angle based on a vehicle speed and a front wheel steering angle determined by a driver is mounted in the vehicle.

Figure 1:
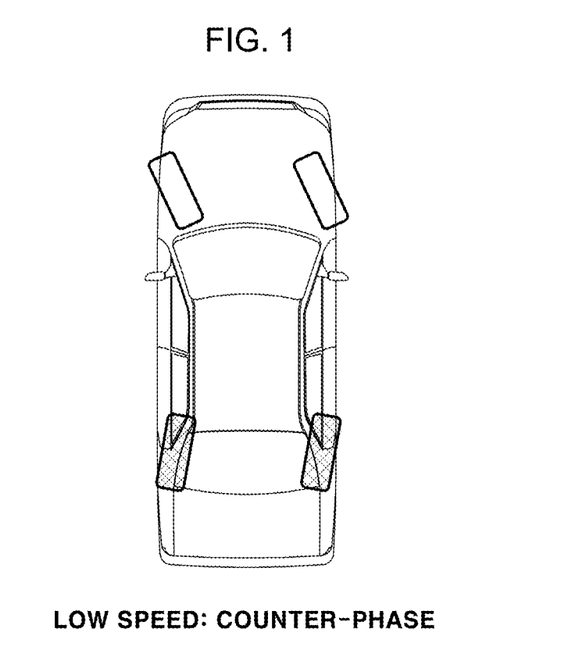
FIG. 1 and FIG. 2 are views schematically illustrating rear wheel steering performed by a rear wheel steering (RWS) system.
Figure 2:
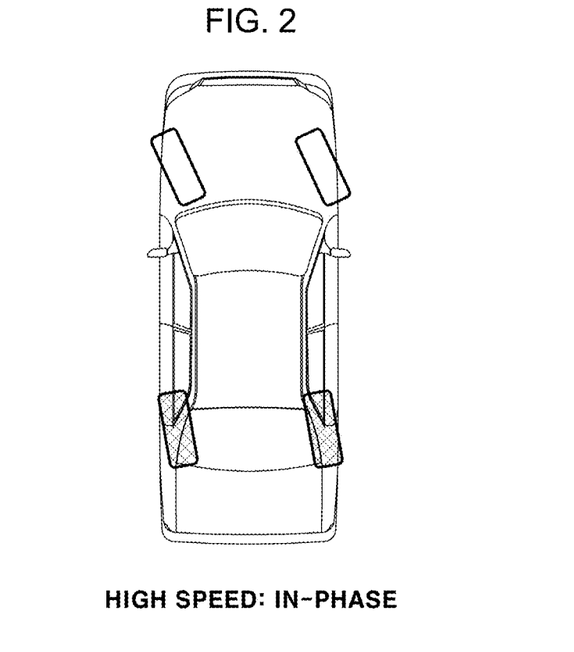

The RWS system serves to control the rear wheel steering angle in counter-phase, that is, opposite direction of that of the front wheels so that the vehicle may rapidly change directions by reducing the turning radius thereof while turning while driving at a low speed, and serves to control the rear wheel steering angle in phase, that is, in the same direction as that of the front wheels so that the vehicle may stably turn while driving at a high speed, as shown in FIG. 1.

Furthermore, when the ignition of the vehicle is turned off in the state in which a steering wheel is operated at a designated angle by a driver and thus the front wheel steering angle is generated, the rear wheels of the vehicle are moved to a neutral position to initialize the RWS system.

On the other hand, when an ignition of the vehicle is turned on in the state in which the front wheel steering angle is generated, the RWS system performs rear wheel steering to generate a target rear wheel steering angle, which is calculated as a value varied depending on the front wheel steering angle.

However, the ignition of the vehicle is turned on in the state in which the front wheel steering angle is generated, the rear wheels are rotated at a steep ramp-up slope up to the target rear wheel steering angle calculated depending on the front wheel steering angle under the control of the RWS system, and thus, the driver may feel a sense of difference due to rapid rear wheel steering immediately after start-up.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a rear wheel steering control system and method for vehicles which may gradually perform rear wheel steering at a gentle ramp-up slope, compared to a conventional rear wheel steering control system and method, for a predetermined time period when the ignition of a vehicle is turned on in the state in which a front wheel steering angle is generated, to prevent rear wheels from being rapidly steered and to eliminate a sense of difference felt by a driver due to rapid rear wheel steering.

Various aspects of the present invention are directed to providing a rear wheel steering control system for vehicles, including a front wheel steering angle sensor configured to detect a front wheel steering angle, a controller electrically connected to the front wheel steering angle sensor and configured to perform ramp-up steering control of rear wheels in the vehicle by generating a ramp-up steering command signal so that the rear wheels of the vehicle are steered at a designated ramp-up slope from a neutral position thereof to a target rear wheel steering angle determined as a value varied depending on the front wheel steering angle, when an ignition of the vehicle is turned on in the state in which the front wheel steering angle is generated, and a rear wheel steering motor electrically connected to the controller and configured to generate a rear wheel steering stroke in response to the ramp-up steering command signal from the controller.

Various aspects of the present invention are directed to providing a rear wheel steering control method for vehicles, including confirming whether a front wheel steering angle of the vehicle is generated in a state in which an ignition of a vehicle is turned on, determining a target rear wheel steering angle corresponding to the front wheel steering angle, upon confirming that the front wheel steering angle is generated, determining a commanded rear wheel steering angle configured to steer rear wheels of the vehicle from a neutral position thereof to the target rear wheel steering angle as a steering angle having a designated ramp-up slope for a constant time, performing ramp-up steering control executed such that the rear wheels of the vehicle are steered from the neutral position thereof to the target rear wheel steering angle at the ramp-up slope of the commanded rear wheel steering angle, and determining whether to continue to perform the ramp-up steering control and to complete the ramp-up steering control.

The methods and apparatuses of the present invention have other features and advantages which will be apparent from or are set forth in more detail in the accompanying drawings, which are incorporated herein, and the following Detailed Description, which together serve to explain certain principles of the present invention.

Other aspects and exemplary embodiments of the present invention are discussed infra.

The above and other features of the present invention are discussed infra.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter reference will now be made in detail to various embodiments of the present invention, examples of which are illustrated in the accompanying drawings and described below. While the present invention will be described in conjunction with exemplary embodiments of the present invention, it will be understood that present description is not intended to limit the present invention to those exemplary embodiments. On the other hand, the present invention is directed to cover not only the exemplary embodiments of the present invention, but also various alternatives, modifications, equivalents and other embodiments, which may be included within the spirit and scope of the present invention as defined by the appended claims.

Figure 3:
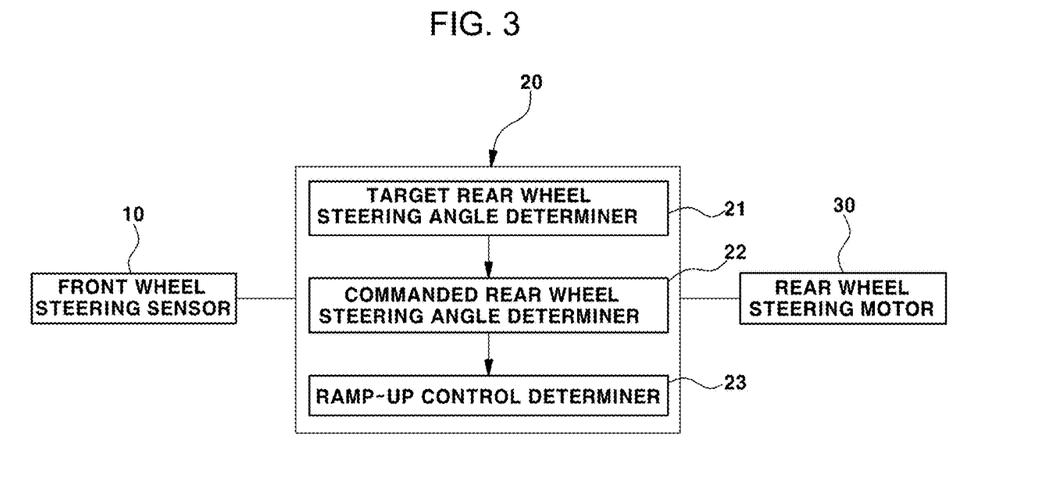
FIG. 3 is a control block diagram illustrating a rear wheel steering control system for vehicles according to various exemplary embodiments of the present invention.

FIG. 3 is a control block diagram illustrating a rear wheel steering control system according to various exemplary embodiments of the present invention.

As shown in FIG. 3, a front wheel steering angle sensor 10 is connected to an input port of a controller 20 configured to control rear wheel steering to be configured for transmitting a signal to the controller 20, and a rear wheel steering motor 30 configured to generate a rear wheel steering stroke in response to a command from the controller 20 is connected to an output port of the controller 20.

The controller 20 performs ramp-up steering control executed such that rear wheels are steered at a designated ramp-up slope from a neutral position thereof to a target rear wheel steering angle determined as a value varied depending on a front wheel steering angle, when the ignition of a vehicle is turned on in the state in which the front wheel steering angle is generated.

For the present purpose, the controller 20 may include a target rear wheel steering angle determiner 21, a commanded rear wheel steering angle determiner 22, and a ramp-up steering control determiner 23.

The target rear wheel steering angle determiner 21 of the controller 20 confirms generation of the front wheel steering angle by receiving a signal from the front wheel steering angle sensor 10 when the ignition of the vehicle is turned on, and determines the target rear wheel steering angle determined as a value varied depending on the front wheel steering angle.

The commanded rear wheel steering angle determiner 22 of the controller 20 determines a commanded rear wheel steering angle for ramp-up steering control to steer the rear wheels at the designated ramp-up slope from the neutral position thereof (0 degrees) to the target rear wheel steering angle for a constant time, when the ignition of the vehicle is turned on in the state in which the front wheel steering angle is generated.

That is to say, the commanded rear wheel steering angle determiner 22 determines the commanded rear wheel steering angle, which is an angle between the neutral position of the rear wheels and the target rear wheel steering angle, as a steering angle having the designated ramp-up slope for the predetermined time period through a determination process of an error corrected slope.

Here, when the rear wheels are steered from the neutral position thereof (0 degrees) to the target rear wheel steering angle compared to the front wheel steering angle when the ignition of the vehicle is turned on, on the assumption that a difference between the neutral position of the rear wheels and the target rear wheel steering angle is referred to as an error, the ramp-up slope of the commanded rear wheel steering angle, which is an angle between the neutral position of the rear wheels and the target rear wheel steering angle, may be referred to as an error corrected slope.

To precisely control the ramp-up slope of the commanded rear wheel steering angle, the determination process of the error corrected slope is performed whenever, assuming that a time for which the rear wheels are steered from the neutral position thereof (0 degrees) to the target rear wheel steering angle is referred to as one ramp-up cycle, a ramp-up update count set to a plurality of number of times is increased by one in one ramp-up cycle.

When the commanded rear wheel steering angle is determined, the commanded rear wheel steering angle determiner 22 of the controller 20 may apply a ramp-up steering command signal (driving signal) corresponding to the commanded rear wheel steering angle to the rear wheel steering motor 30, and the rear wheel steering motor 30 may be operated to generate a rear wheel steering stroke for the commanded rear wheel steering angle.

The ramp-up steering control determiner 23 of the controller 20 is configured to determine whether or not to continue to perform the ramp-up steering control and to complete the ramp-up steering control, in which the rear wheels are steered at the designated ramp-up slope from the neutral position thereof (0 degrees) to the target rear wheel steering angle for the constant time, depending on an error indicating a difference between the target rear wheel steering angle and the commanded rear wheel steering angle.

For example, the ramp-up steering control determiner 23 determines that ramp-up steering control is completed when the target rear wheel steering angle and the commanded rear wheel steering angle are equal or the error between the target rear wheel steering angle and the commanded rear wheel steering angle is equal to or less than a reference value, and determines that the ramp-up steering control needs to be continued when the error between the target rear wheel steering angle and the commanded rear wheel steering angle exceeds the reference value.

Here, a rear wheel steering control method for vehicles according to various exemplary embodiments of the present invention based on the above-described configuration of the rear wheel steering control system will be described in order as follows.

Figure 4:
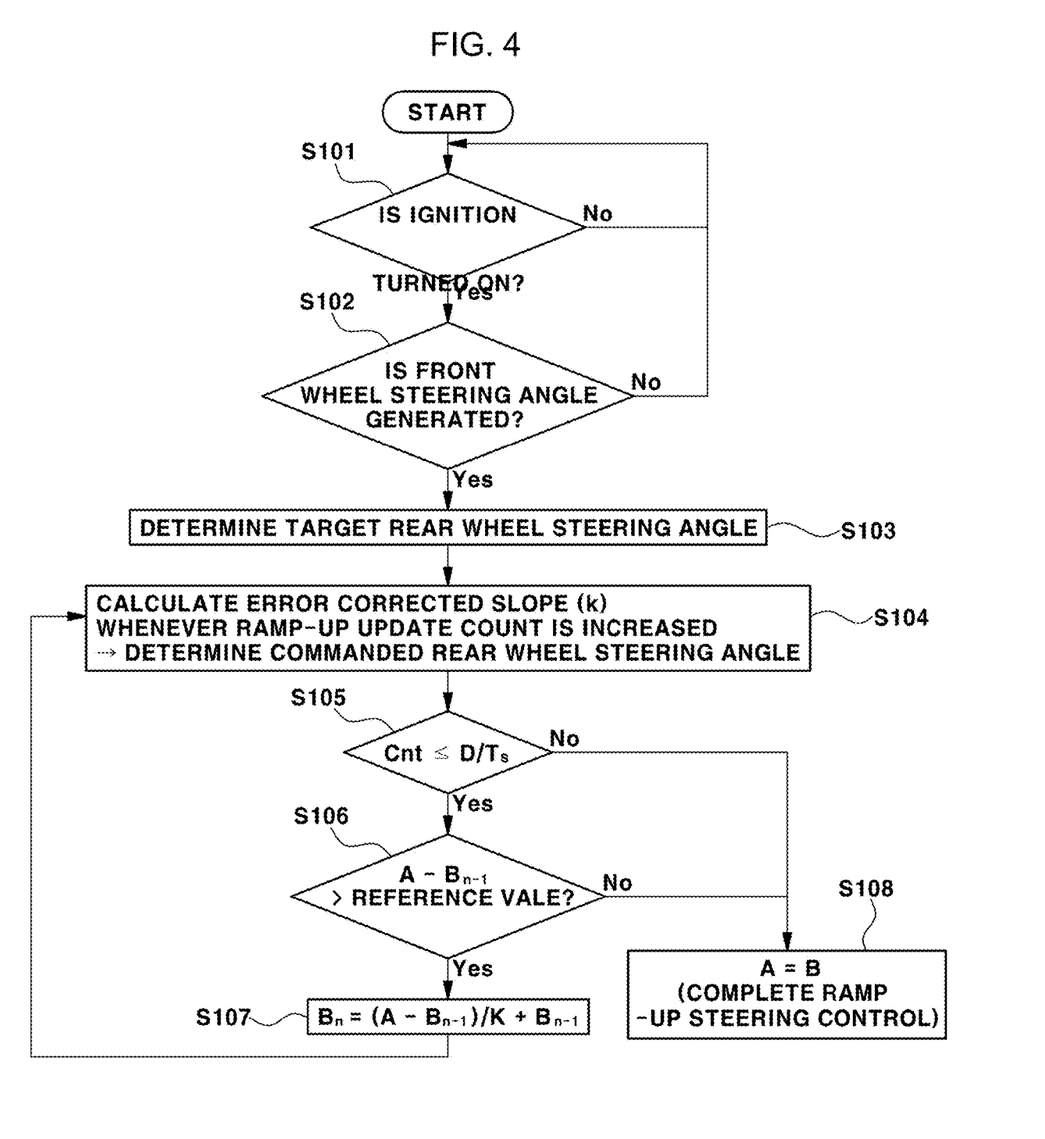
FIG. 4 is a flowchart illustrating a rear wheel steering control method for vehicles according to various exemplary embodiments of the present invention.
Figure 5:
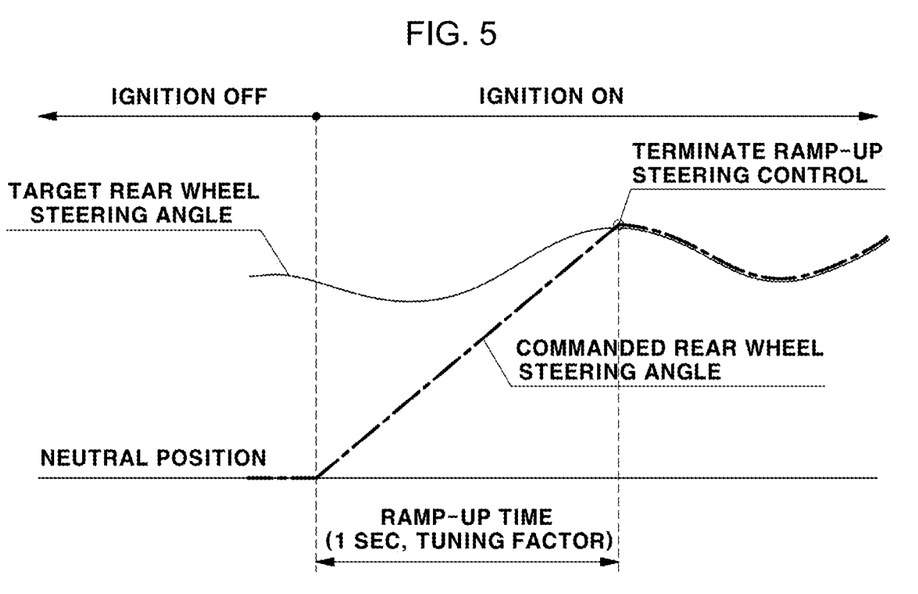
FIG. 5 is a control graph illustrating the rear wheel steering control method for vehicles according to various exemplary embodiments of the present invention.

FIG. 4 is a flowchart illustrating the rear wheel steering control method for vehicles according to various exemplary embodiments of the present invention, and FIG. 5 is a control graph illustrating the rear wheel steering control method for vehicles according to various exemplary embodiments of the present invention.

First, the controller 20 confirms whether or not the ignition of the vehicle is turned on (S101).

Subsequently, the controller 20 confirms whether or not a front wheel steering angle of the vehicle is generated (S102).

For example, the controller 20 may confirm whether or not the front wheel steering angle is generated by receiving a signal from the front wheel steering angle sensor 10.

Subsequently, upon confirming that the front wheel steering angle is generated, the controller 20 determines a target rear wheel steering angle A determined depending on the front wheel steering angle (S103).

Thereafter, to determine the commanded rear wheel steering angle configured to steer the rear wheels from the neutral position thereof (0 degrees) to the target rear wheel steering angle as a steering angle having a designated ramp-up slope for a constant time, the commanded rear wheel steering angle determiner 22 of the controller 20 determines an error corrected slope k whenever the ramp-up update count set to a plurality of number of times is increased by one (S104).

As described above, when the rear wheels are steered from the neutral position thereof (0 degrees) to the target rear wheel steering angle compared to the front wheel steering angle when the ignition of the vehicle is turned on, on the assumption that a difference between the neutral position of the rear wheels and the target rear wheel steering angle is referred to as an error, the ramp-up slope of the commanded rear wheel steering angle, which is an angle between the neutral position of the rear wheels and the target rear wheel steering angle, may be referred to as the error corrected slope k.

Furthermore, to precisely control the ramp-up slope of the commanded rear wheel steering angle, the determination process of the error corrected slope k is performed whenever, assuming that a time for which the rear wheels are steered from the neutral position thereof (0 degrees) to the target rear wheel steering angle is referred to as one ramp-up cycle, the ramp-up update count set to a plurality of number of times is increased by one in one ramp-up cycle.

Here, the error corrected slope k may be determined by the following Equation 1.

$$k = \frac{50-300}{D} + C_{nt} \times T_s + 300 \qquad \text{[Equation 1]}$$

In the above Equation 1, k indicates an error corrected slope, D indicates a ramp-up cycle (time), $C_{nt}$ indicates a ramp-up update count, $T_s$ indicates a sampling time in the ramp-up cycle, and the 50 and the 300 indicate tuning parameters.

For example, the ramp-up cycle D which is a tunable factor may be set to 1 second, the sampling time $T_s$ may be set to 0.001 seconds, and the ramp-up update count $C_{nt}$ may be finally set to be increased from 1 up to 1000 one by one.

Therefore, through the repeated determination of the error corrected slope k, the commanded rear wheel steering angle configured to steer the rear wheels from the neutral position thereof (0 degrees) to the target rear wheel steering angle may be determined as a steering angle having a gentle ramp-up slope for a constant time.

Here, when the commanded rear wheel steering angle is determined, the commanded rear wheel steering angle determiner 22 of the controller 20 may apply a driving signal corresponding to the commanded rear wheel steering angle to the rear wheel steering motor 30, and thus, ramp-up steering control, in which the rear wheels are steered from the neutral position thereof (0 degrees) to the target rear wheel steering angle at the ramp-up slope of the commanded rear wheel steering angle, may be performed.

Thereafter, the ramp-up steering control determiner 23 of the controller 20 determines whether or not to continue to perform the ramp-up steering control and to complete the ramp-up steering control.

For the present purpose, the ramp-up update count $C_{nt}$ is compared with a value ($D/T_s$) acquired by dividing the ramp-up cycle D by the sampling time $T_s$ in the ramp-up cycle D (S105).

As a result of comparison, when the ramp-up update count $C_{nt}$ exceeds the value ($D/T_s$) acquired by dividing the ramp-up cycle D by the sampling time $T_s$ in the ramp-up cycle D, it may be regarded that the commanded rear wheel steering angle B reaches the target rear wheel steering angle A (A=B), and it may be determined that the ramp-up steering control is completed (S108).

On the other hand, when the ramp-up update count $C_{nt}$ is less than the value ($D/T_s$) acquired by dividing the ramp-up cycle D by the sampling time $T_s$ in the ramp-up cycle D, whether or not to continue to perform the ramp-up steering control and to complete the ramp-up steering control may be determined based on the error corresponding to the difference between the target rear wheel steering angle and the commanded rear wheel steering angle.

For example, the ramp-up steering control determiner 23 determines that the ramp-up steering control is completed and thus terminates the ramp-up steering control when the error ($A-B_{n-1}$) between the target rear wheel steering angle A and the commanded rear wheel steering angle $B_{n-1}$ is equal to or less than a reference value (a tuning parameter) (S108), and on the other hand, determines that the ramp-up steering controls needs to be continued when the error ($A-B_{n-1}$) between the target rear wheel steering angle A and the commanded rear wheel steering angle $B_{n-1}$ exceeds the reference value.

When the error ($A-B_{n-1}$) between the target rear wheel steering angle A and the commanded rear wheel steering angle $B_{n-1}$ exceeds the reference value, the target rear wheel steering angle determiner 21 of the controller 20 determines again the commanded rear wheel steering angle based on the following Equation 2, to continue to perform the ramp-up steering control configured to steer the rear wheels from the neutral position thereof to the target rear wheel steering angle at the ramp-up slope of the commanded rear wheel steering angle (S107).

$$B_n = (A - B_{n-1})/k + B_{n-1} \qquad \text{[Equation 2]}$$

In the above Equation 2, $B_n$, indicates a commanded rear wheel steering angle determined at each sampling time (i.e., at the current sampling time) in the ramp-up cycle, A indicates a target rear wheel steering angle, k indicates an error corrected slope, and $B_{n-1}$ indicates a commanded rear wheel steering angle determined at the previous sampling time.

After the commanded rear wheel steering angle is determined based on the above Equation 2, Operations S104 to S106 are repeated, and the ramp-up steering control is terminated when the error (A–$B_{n-1}$) between the target rear wheel steering angle A and the commanded rear wheel steering angle $B_{n-1}$ is equal to or less than the reference value (the tuning parameter) (S108).

Figure 6:
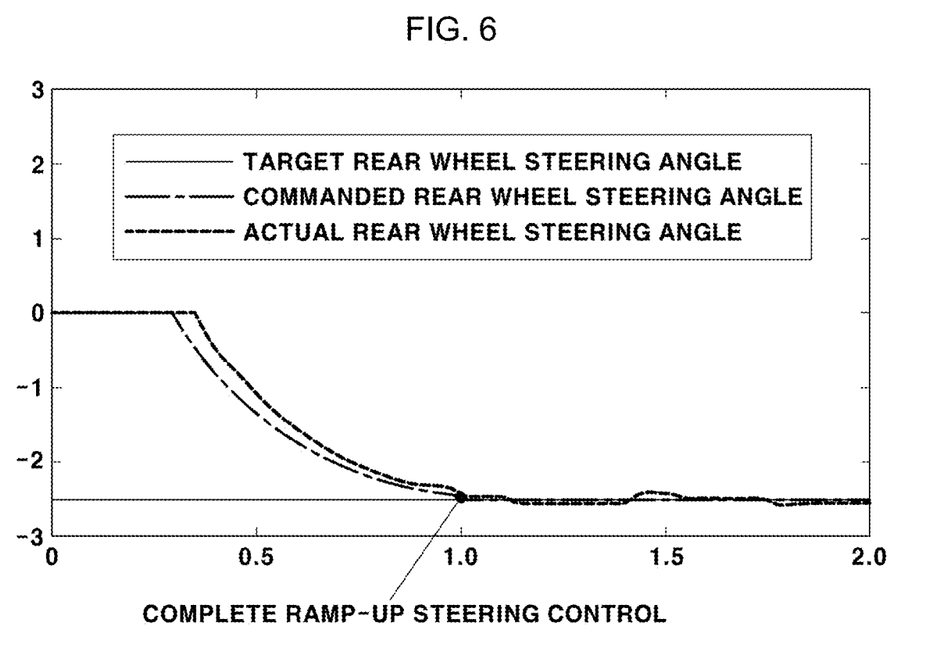
FIG. 6 and FIG. 7 are graphs representing test results for the rear wheel steering control system and method for vehicles according to various exemplary embodiments of the present invention, showing that an actual rear wheel steering angle has a gentle ramp-up slope.
Figure 7:
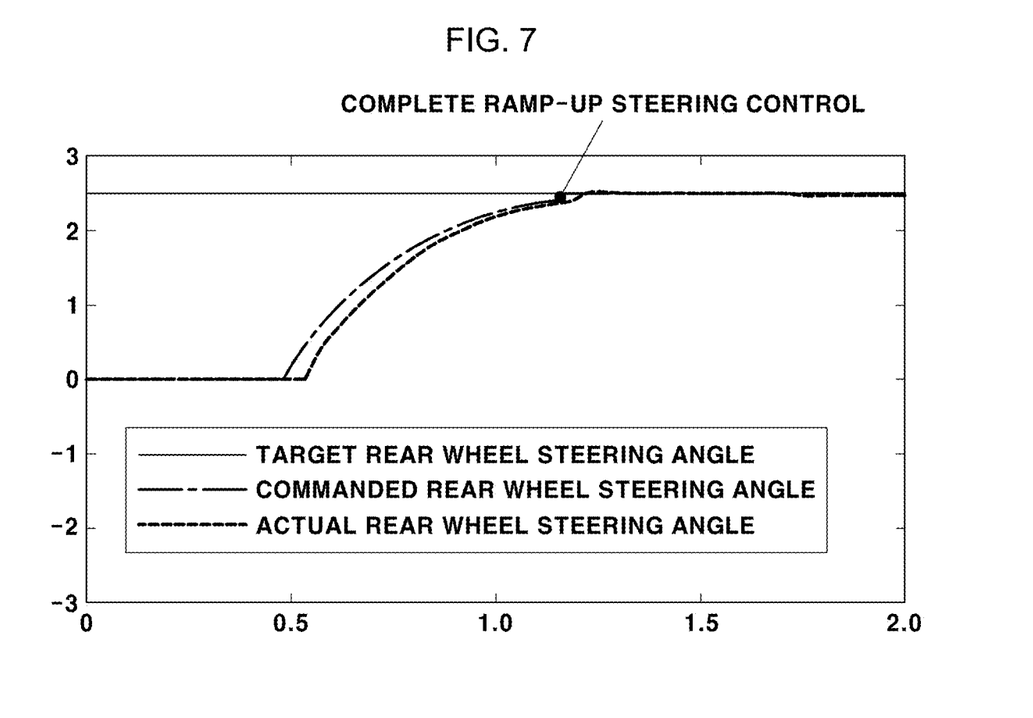

When the ignition of the vehicle is turned on in the state in which a front wheel steering angle, such as a left-turn or a right-turn, is generated, whether or not the rear wheels are steered from the neutral position thereof to the target rear wheel steering angle at the gentle ramp-up slope of the commanded rear wheel steering angle was tested, and test results are shown in FIG. 6 and FIG. 7.

A dotted line displayed in FIG. 6 and FIG. 7 indicates an actual rear wheel steering angle measured by the sensor, an alternated long and short dash line displayed in FIG. 6 and FIG. 7 indicates a commanded rear wheel steering angle, and it may be confirmed that the commanded rear wheel steering angle and the actual rear wheel steering angle coincide with each other, and that the rear wheels are easily steered from the neutral position thereof to the target rear wheel steering angle at the gentle ramp-up slope of the commanded rear wheel steering angle when the ignition of the vehicle is turned on in the state in which a front wheel steering angle, such as a left-turn or a right-turn, is generated.

Accordingly, when the ignition of the vehicle is turned on in the state in which the front wheel steering angle is generated, ramp-up steering control configured to steer the rear wheels from the neutral position thereof to the target rear wheel steering angle at the gentle ramp-up slope of the commanded rear wheel steering angle is performed, rear wheel steering may be gradually performed at the gentle ramp-up slope, compared to a conventional rear wheel steering control system and method, for a constant time, being configured for preventing the rear wheels from being rapidly steered and eliminating a sense of difference felt by a driver due to rapid rear wheel steering.

As is apparent from the above description, a rear wheel steering control system and method for vehicles according to various exemplary embodiments of the present invention may provide the following effects.

The rear wheel steering control system and method for vehicles according to various exemplary embodiments of the present invention perform ramp-up steering control configured to steer rear wheels from the neutral position thereof to a target rear wheel steering angle at a gentle ramp-up slope of a commanded rear wheel steering angle, and may thus gradually perform rear wheel steering at the gentle ramp-up slope, compared to a conventional rear wheel steering control system and method, for a constant time, being configured for preventing the rear wheels from being rapidly steered and eliminating a sense of difference felt by a driver due to rapid rear wheel steering.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by a plurality of control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A system of controlling rear wheel steering of a vehicle, the system comprising:

a front wheel steering angle sensor configured to detect a front wheel steering angle of the vehicle;

a controller electrically connected to the front wheel steering angle sensor and configured to perform ramp-up steering control of rear wheels in the vehicle by generating a ramp-up steering command signal so that the rear wheels of the vehicle are steered at a designated ramp-up slope from a neutral position thereof to a target rear wheel steering angle determined as a value varied depending on the front wheel steering angle based on a signal from the front wheel steering angle sensor, when an ignition of the vehicle is turned on; and a rear wheel steering motor electrically connected to the controller and configured to generate a rear wheel steering stroke in response to the ramp-up steering command signal from the controller, wherein the controller is configured:
to confirm generation of the front wheel steering angle by receiving a signal from the front wheel steering angle sensor when the ignition of the vehicle is turned on, and to determine the target rear wheel steering angle determined as a value varied depending on the front wheel steering angle, to determine a commanded rear wheel steering angle for the ramp-up steering control to steer the rear wheels according to the designated ramp-up slope from the neutral position thereof to the target rear wheel steering angle for a predetermined time period, and to apply a driving signal corresponding to the determined commanded rear wheel steering angle to the rear wheel steering motor, and to determine whether to continue to perform the ramp-up steering control and to complete the ramp-up steering control executed so that the rear wheels are steered according to the designated ramp-up slope from the neutral position thereof to the target rear wheel steering angle for the predetermined time period, and wherein, in the determining of whether to continue or to complete the ramp-up steering control, when a ramp-up update count exceeds a value acquired by dividing a ramp-up cycle by a sampling time in the ramp-up cycle, the controller is configured to conclude that the ramp-up steering control is completed.

2. The system of claim 1, wherein the controller includes:
a target rear wheel steering angle determiner configured to confirm the generation of the front wheel steering angle by receiving the signal from the front wheel steering angle sensor when the ignition of the vehicle is turned on, and to determine the target rear wheel steering angle determined as the value varied depending on the front wheel steering angle;

a commanded rear wheel steering angle determiner configured to determine the commanded rear wheel steering angle for the ramp-up steering control to steer the rear wheels according to the designated ramp-up slope from the neutral position thereof to the target rear wheel steering angle for the predetermined time period, and to apply the driving signal corresponding to the determined commanded rear wheel steering angle to the rear wheel steering motor; and a ramp-up steering control determiner configured to determine whether to continue to perform the ramp-up steering control and to complete the ramp-up steering control executed so that the rear wheels are steered according to the designated ramp-up slope from the neutral position thereof to the target rear wheel steering angle for the predetermined time period.

3. The system of claim 1,
wherein the ramp-up cycle is defined as a period for which the rear wheels are steered from the neutral position of the rear wheels to the target rear wheel steering angle, and wherein a commanded rear wheel steering angle determiner is configured to determine the commanded rear wheel steering angle having a predetermined ramp-up slope for the predetermined time period by a calculation process of an error corrected slope, wherein the calculation process is repeated whenever the ramp-up update count increments by one within one ramp-up cycle.

4. The system of claim 1,
wherein a ramp-up steering control determiner is configured to determine that the ramp-up steering control is completed when an error between the target rear wheel steering angle and the commanded rear wheel steering angle is equal to or less than a reference value, and to determine that the ramp-up steering control needs to be continued when the error between the target rear wheel steering angle and the commanded rear wheel steering angle exceeds the reference value.

5. The system of claim 3, wherein the error corrected slope is determined by a following Equation:

$$k = \frac{50-300}{D} + C_{nt} \times T_s + 300,$$

wherein k indicates the error corrected slope, D indicates the ramp-up cycle, $C_{nt}$ indicates the ramp-up update count, $T_s$ indicates a sampling time in the ramp-up cycle, and the 50 and the 300 indicate tuning parameters.

6. The system of claim 1, wherein, in the determining of whether to continue or to complete the ramp-up steering control, when the ramp-up update count is less than the value acquired by dividing the ramp-up cycle by the sampling time in the ramp-up cycle, the controller is configured to determine whether to continue or to complete the ramp-up steering control based on an error between the target rear wheel steering angle and the commanded rear wheel steering angle.

7. The system of claim 6, wherein, the controller is configured to conclude that the ramp-up steering control is completed when the error between the target rear wheel steering angle and the commanded rear wheel steering angle is equal to or less than a reference value, and that the ramp-up steering control needs to be continued when the error between the target rear wheel steering angle and the commanded rear wheel steering angle exceeds the reference value.

8. The system of claim 7, wherein the commanded rear wheel steering angle configured to continue to perform the ramp-up steering control is determined by a following Equation:

$$B_n = (A - B_{n-1})/k + B_{n-1}.$$

wherein $B_n$ indicates a commanded rear wheel steering angle determined at each sampling time in the ramp-up cycle, A indicates the target rear wheel steering angle, k indicates an error corrected slope, and $B_{n-1}$ indicates a commanded rear wheel steering angle determined at a previous sampling time.

9. A method of controlling rear wheel steering of a vehicle, the method comprising:
confirming, by a controller, whether a front wheel steering angle of the vehicle is generated in a state in which an ignition of the vehicle is turned on;
determining, by the controller, a target rear wheel steering angle corresponding to the front wheel steering angle, upon confirming that the front wheel steering angle is generated;
determining, by the controller, a commanded rear wheel steering angle to steer rear wheels of the vehicle from a neutral position thereof to the target rear wheel steering angle as a steering angle having a designated ramp-up slope for a predetermined time period;
performing, by the controller, ramp-up steering control so that the rear wheels of the vehicle are steered from the neutral position thereof to the target rear wheel steering angle according to the ramp-up slope of the commanded rear wheel steering angle; and
determining, by the controller, whether to continue to perform the ramp-up steering control and to complete the ramp-up steering control,
wherein a ramp-up cycle is defined as a period for which the rear wheels are steered from the neutral position of the rear wheels to the target rear wheel steering angle, and wherein the commanded rear wheel steering angle is determined by the controller configured to determine the commanded rear wheel steering angle having a predetermined ramp-up slope for the predetermined time period by a calculation process of an error corrected slope, wherein the calculation process is repeated whenever a ramp-up update count increments by one within one ramp-up cycle,
in the determining of whether to continue or to complete the ramp-up steering control, when the ramp-up update count exceeds a value acquired by dividing the ramp-up cycle by a sampling time in the ramp-up cycle, concluding, by the controller, that the ramp-up steering control is completed.

10. The method of claim 9, wherein the error corrected slope is determined by a following Equation:

$$k = \frac{50-300}{D} + C_{nt} \times T_s + 300,$$

wherein k indicates the error corrected slope, D indicates the ramp-up cycle, $C_{nt}$ indicates the ramp-up update count, $T_s$ indicates a sampling time in the ramp-up cycle, and the 50 and the 300 indicate tuning parameters.

11. The method of claim 9, further including:
in the determining of whether to continue or to complete the ramp-up steering control, when the ramp-up update count is less than the value acquired by dividing the ramp-up cycle by the sampling time in the ramp-up cycle, determining, by the controller, whether to continue or to complete the ramp-up steering control based on an error between the target rear wheel steering angle and the commanded rear wheel steering angle.

12. The method of claim 11, further including:
concluding, by the controller, that the ramp-up steering control is completed when the error between the target rear wheel steering angle and the commanded rear wheel steering angle is equal to or less than a reference value, and that the ramp-up steering control needs to be continued when the error between the target rear wheel steering angle and the commanded rear wheel steering angle exceeds the reference value.

13. The method of claim 12, wherein the commanded rear wheel steering angle configured to continue to perform the ramp-up steering control is determined by a following Equation:

$$B_n = (A - B_{n-1})/k + B_{n-1}.$$

wherein $B_n$ indicates a commanded rear wheel steering angle determined at each sampling time in the ramp-up cycle, A indicates the target rear wheel steering angle, k indicates an error corrected slope, and $B_{n-1}$ indicates a commanded rear wheel steering angle determined at a previous sampling time.

14. The method of claim 13, further including:
after the ramp-up steering control has been determined to continue, when the error between the target rear wheel steering angle and the commanded rear wheel steering angle is equal to or less than the reference value, terminating, by the controller, the ramp-up steering control.

15. A non-transitory computer readable storage medium on which a program for performing the method of claim 9 is recorded.

* * * * *